United States Patent
Fukami et al.

(10) Patent No.: US 9,437,956 B2
(45) Date of Patent: Sep. 6, 2016

(54) WATERPROOF CONNECTOR AND MANUFACTURING METHOD THEREOF

(71) Applicant: J.S.T. Mfg. Co., Ltd., Osaka-shi (JP)

(72) Inventors: Tsuyoshi Fukami, Osaka (JP); Yoichi Nakazawa, Osaka (JP); Takahito Nasu, Osaka (JP)

(73) Assignee: J.S.T. MFG. CO., LTD., Osaka-shi (JP)

( * ) Notice: Subject to any disclaimer, the term of this patent is extended or adjusted under 35 U.S.C. 154(b) by 0 days.

(21) Appl. No.: 14/224,366

(22) Filed: Mar. 25, 2014

(65) Prior Publication Data
US 2014/0308833 A1    Oct. 16, 2014

(30) Foreign Application Priority Data

Apr. 12, 2013  (JP) .................................. 2013-084064

(51) Int. Cl.
| H01R 13/52 | (2006.01) |
| --- | --- |
| B29C 70/72 | (2006.01) |
| H01R 43/00 | (2006.01) |
| H01R 43/24 | (2006.01) |
| H01R 12/72 | (2011.01) |
| H01R 13/6581 | (2011.01) |

(52) U.S. Cl.
CPC ........... *H01R 13/5202* (2013.01); *B29C 70/72* (2013.01); *H01R 43/005* (2013.01); *H01R 43/24* (2013.01); *H01R 12/727* (2013.01); *H01R 13/6581* (2013.01)

(58) Field of Classification Search
CPC  H01R 13/5202; H01R 43/24; H01R 13/748; H01R 13/52; H01R 13/5219; H01R 13/6594
See application file for complete search history.

(56) References Cited

U.S. PATENT DOCUMENTS

| 5,222,909 A | * | 6/1993 | Nomura et al. | ......... 439/607.01 |
| 7,922,535 B1 | * | 4/2011 | Jiang et al. | .............. 439/607.35 |
| 8,052,467 B1 | | 11/2011 | Xie et al. | |
| 2003/0124912 A1 | * | 7/2003 | Murakami et al. | ........... 439/701 |

(Continued)

FOREIGN PATENT DOCUMENTS

| CN | 201725958 U | 1/2011 |
| --- | --- | --- |
| CN | 201789147 U | 4/2011 |
| CN | 102368579 A | 3/2012 |

(Continued)

OTHER PUBLICATIONS

Extended European Search Report dated Sep. 17, 2014 in the corresponding European patent application No. 14163215.8-1801.

(Continued)

*Primary Examiner* — Jean F Duverne
(74) *Attorney, Agent, or Firm* — Kratz, Quintos & Hanson, LLP

(57) ABSTRACT

A waterproof connector has: at least one conductive contact; a metal shell interior of which the contact is disposed; and a housing made of an insulating resin material such that the housing fixes the contact and the shell to form an integral structure, the shell has an insertion port into which a counterpart connector is inserted on one side, and the housing is formed such that the shell is exposed at the outer circumference of and at the vicinity of the insertion port over a predetermined width in the length direction of the shell to form an outer circumferential exposure portion, and the outer circumferential exposure portion of the shell is disposed with a waterproof portion made of an elastic material.

11 Claims, 11 Drawing Sheets

(56) References Cited

U.S. PATENT DOCUMENTS

2011/0230074 A1    9/2011   Schmidt et al.
2012/0115356 A1    5/2012   Tashiro

FOREIGN PATENT DOCUMENTS

| CN | 202217852 U | 5/2012 |
|---|---|---|
| CN | 102544888 A | 7/2012 |
| CN | 202585914 U | 12/2012 |
| EP | 2 544 313 A1 | 1/2013 |
| JP | H07-226259 A | 8/1995 |
| JP | H10-294024 A | 11/1998 |
| JP | 2012-033427 A | 2/2012 |
| WO | 2011/115788 A2 | 9/2011 |
| WO | WO 2011/108679 A1 | 9/2011 |

OTHER PUBLICATIONS

English abstract directed to Chinese reference 202217852U filed in IDS dated Dec. 18, 2014.

Office Action dispatched on Feb. 9, 2016 from the European Patent Office regarding corresponding European patent application No. 14163215.8.

Office Action issued Nov. 6, 2015 from the Japan Patent Office regarding corresponding Japanese patent application No. 2013-084064.

* cited by examiner

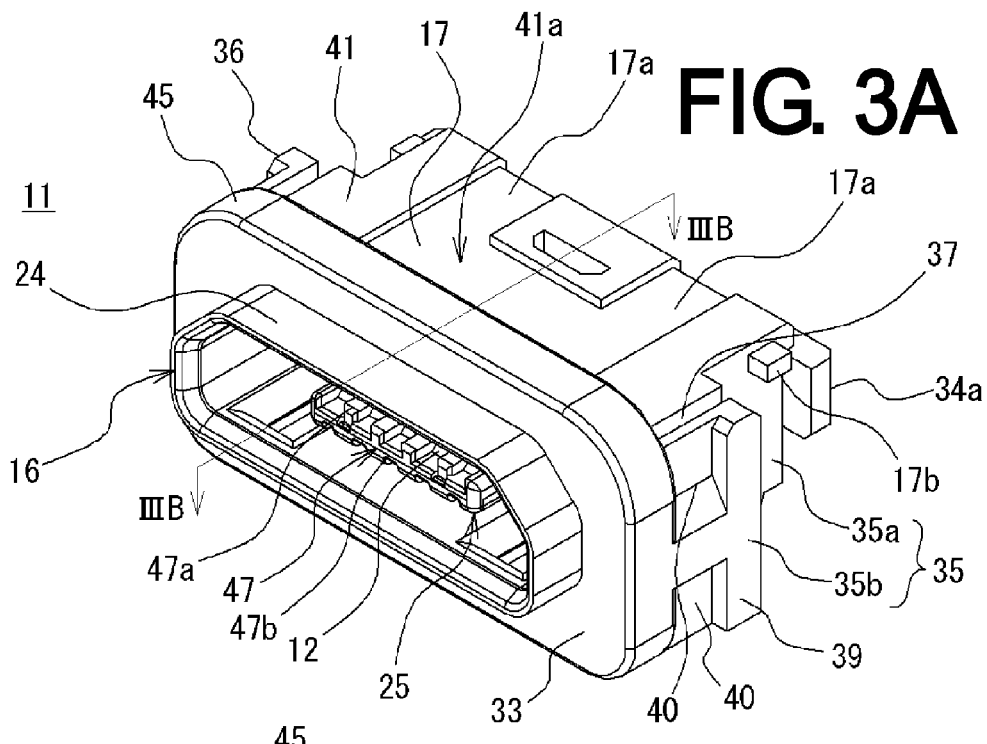
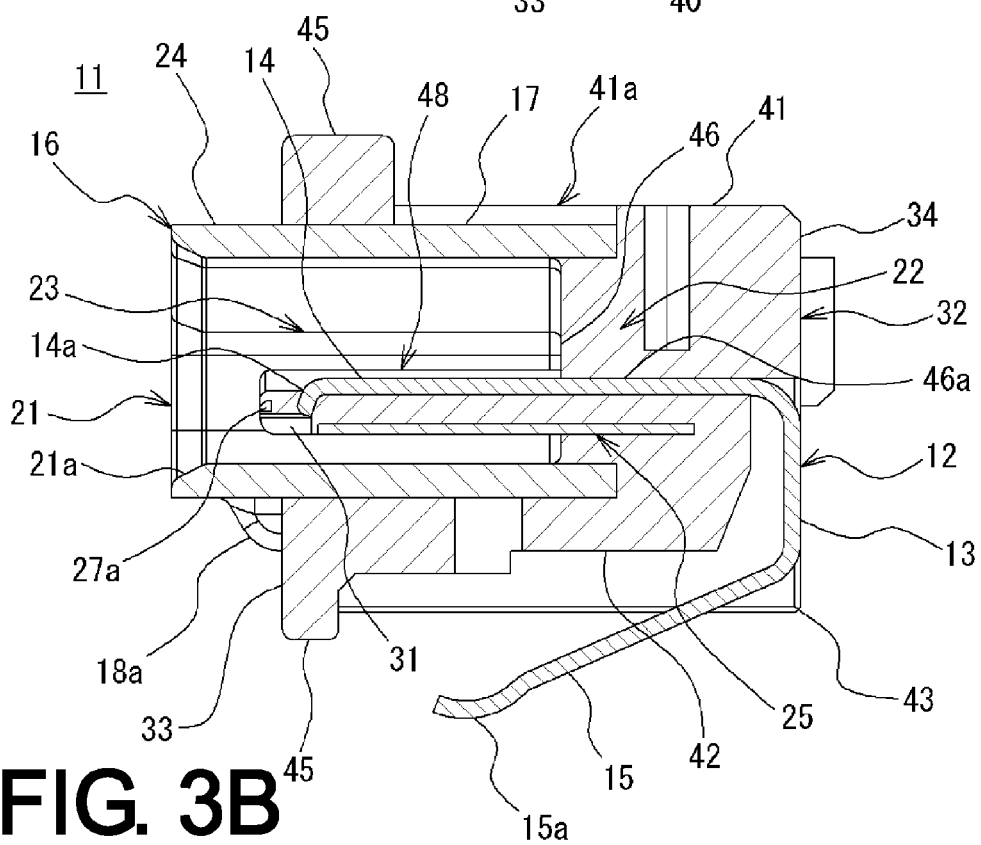

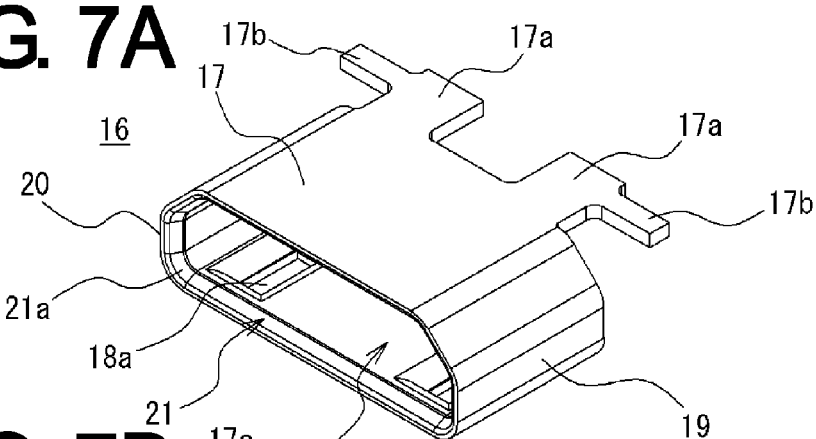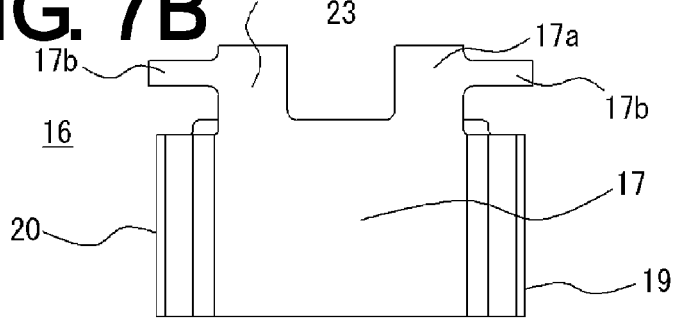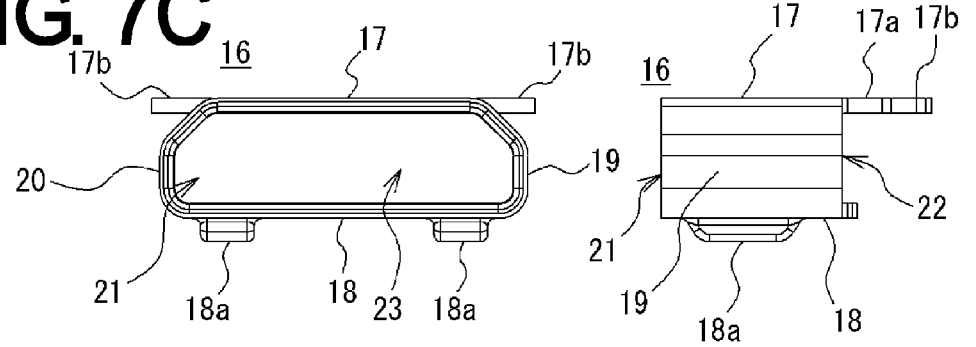

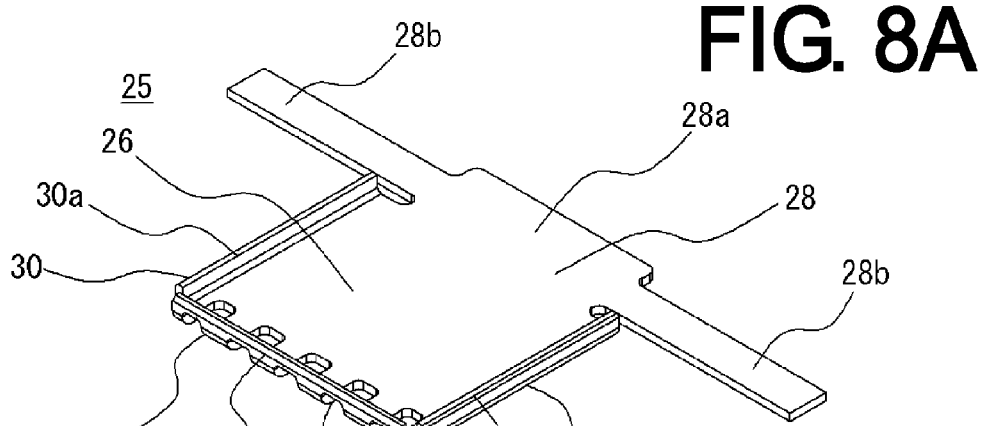
FIG. 8A
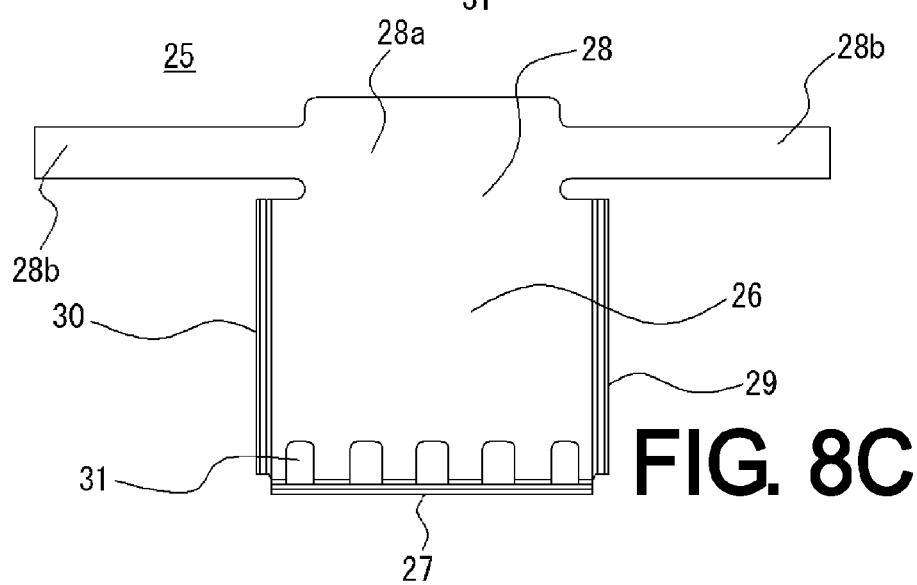
FIG. 8B
FIG. 8C
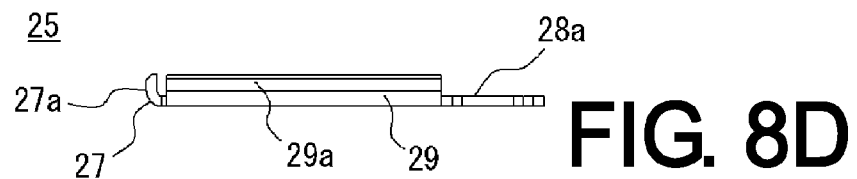
FIG. 8D

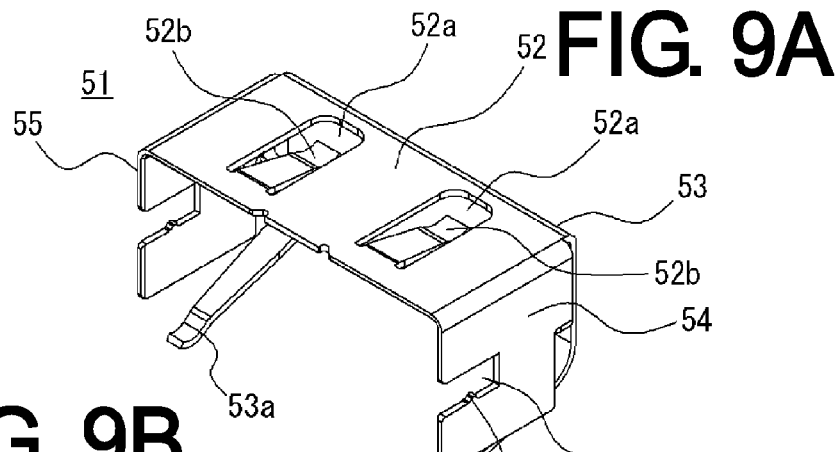
FIG. 9A
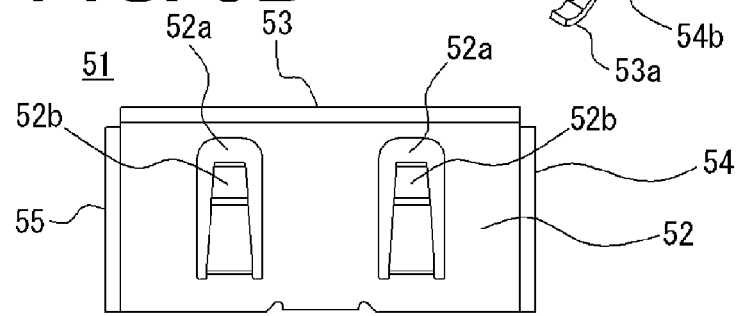
FIG. 9B
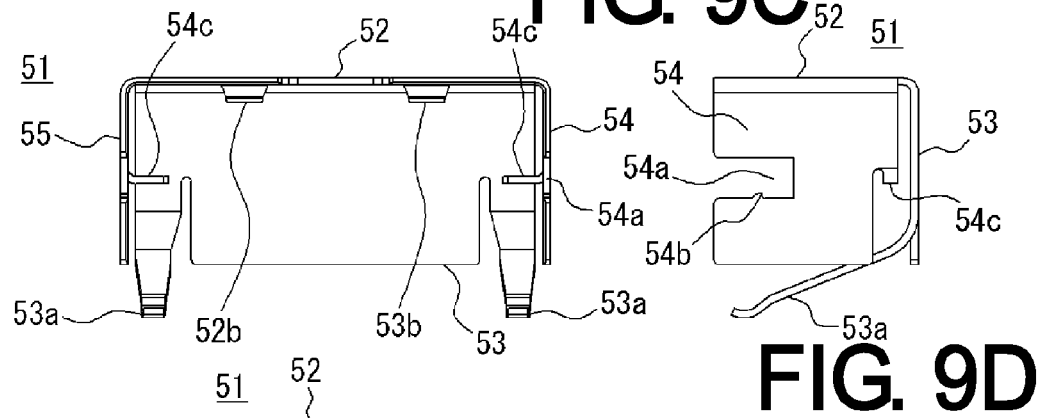
FIG. 9C
FIG. 9D
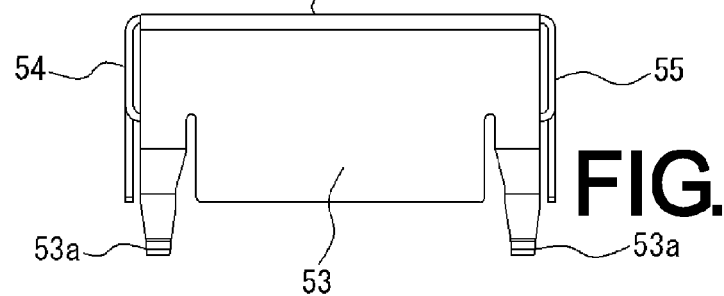
FIG. 9E

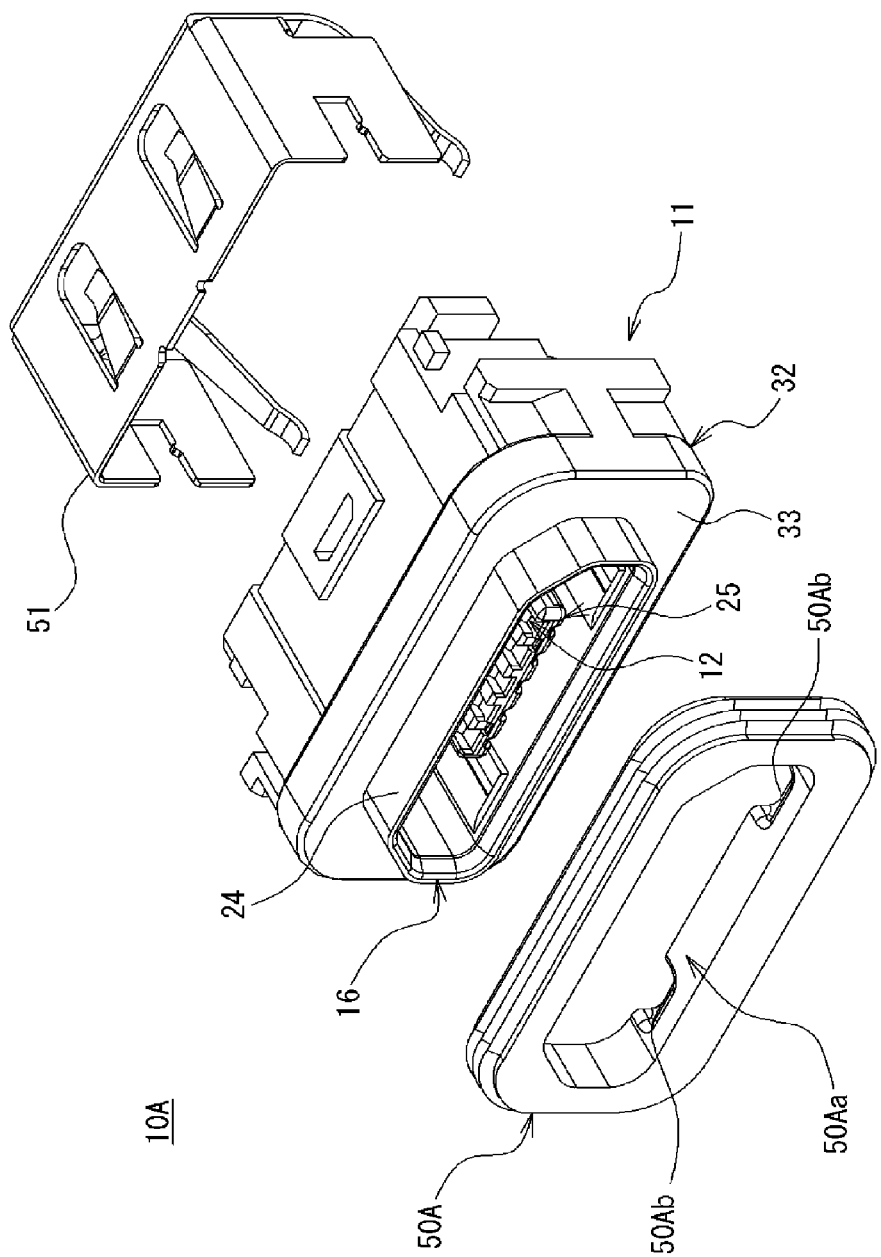

WATERPROOF CONNECTOR AND MANUFACTURING METHOD THEREOF

BACKGROUND OF THE INVENTION

1. Field of the Invention

The present invention relates to a waterproof connector including a metal shell and a manufacturing method thereof and particularly to a waterproof connector having a waterproofing member directly disposed on a shell and a manufacturing method thereof.

2. Background Art

A waterproof connector having waterproof property is recently known. In a method conventionally employed for acquiring the waterproof property of a connector, a housing is insert-molded or assembled on the outside of a shell making up the connector to achieve a configuration with a resin material such as rubber attached to the outer circumference of the housing, and this resin material is pressed against a component or a surface desired to be closely attached thereto, such as a counterpart connector, thereby acquiring the waterproof property of the connector.

For such a connector, for example, an invention of a connection device (connector) for electronic equipment having a waterproof function is disclosed in WO 2011/108679. The connection device having a waterproof function disclosed in WO 2011/108679 includes a substantially tubular housing, a supporting portion formed into a wall shape in the housing, contact terminals and power terminals supported by the supporting portion, a shell mounted inside the housing, a seal material disposed in the vicinity of an end portion of the housing on the connection terminal insertion side along the outer circumference of the housing. In the invention of the connection device for electronic equipment having a waterproof function disclosed in WO 2011/108679, it is described that water can be prevented from deeply entering between a case and the connection device and the water infiltration to a circuit board can more certainly be prevented by disposing the seal material in the vicinity of the end portion of the housing on the connection terminal insertion side.

The connection device for electronic equipment having a waterproof function disclosed in WO 2011/108679 has the seal material disposed along the outer circumference of the housing and the shell mounted inside the housing. Therefore, since the seal material is disposed outside the shell and the housing, the connection device problematically increases in size. Since the seal material must separately be disposed, a manufacturing process of the connection device is problematically complicated.

As a result of various experiments conducted in view of such problematic issues and problems to be solved of the conventional technique, the inventor found out that a waterproof connector can be downsized by directly disposing a waterproofing member on a shell, thereby completing the present invention.

SUMMARY

It is therefore an object of the present invention to provide a small-sized waterproof connector and to provide an easily-manufactured waterproof connector. Another object of the present invention is to provide a manufacturing method of a waterproof connector for downsizing and to provide a manufacturing method of a waterproof connector for easier manufacturing.

To solve the problems, a waterproof connector of a first aspect of the present invention is a waterproof connector comprising: at least one contact made of a conductive material; and a shell made of metal interior of which the contact is disposed, wherein the shell has an insertion port into which a counterpart connector is inserted on one side, and a waterproof portion made of an elastic material is disposed on an outer circumference of and at the vicinity of the insertion port of the shell.

A waterproof connector of a second aspect is the waterproof connector of the first aspect, wherein the contact and shell are fixed by a housing made of an insulating resin material so as to form an integral structure, the housing is formed such that the shell is exposed at the outer circumference of and at the vicinity of the insertion port to form an outer circumferential exposure portion, and the outer circumferential exposure portion of the shell is disposed with the waterproof portion.

A waterproof connector of a third aspect is the waterproof connector of the first or second aspect, wherein the waterproof portion is a waterproof member integrally formed from the elastic material with the shell by insert molding.

A waterproof connector of a fourth aspect is the waterproof connector of the first or second aspect, wherein the waterproof portion is formed by attaching a waterproof component thereto made of the elastic material.

A waterproof connector of a fifth aspect is the waterproof connector of any one of the second to fourth aspects, wherein the shell is closed on the side opposite to the insertion port by a closing portion formed in the housing, the closing portion fixes the contact such that one side of the contact is disposed interior of the shell and the other side of the contact is projected outside the shell, a portion of the closing portion where the contact is fixed to is provided with a contact supporting portion extended therefrom for supporting the contact, the contact supporting portion is formed with a contact exposing portion for exposing a portion of the contact to which a counterpart contact of the counterpart connector comes into contact, and a plate-shaped reinforcing member is integrally disposed on the side opposite to the contact exposing portion across the contact supporting portion.

A waterproof connector of a sixth aspect is the waterproof connector of any one of the second to fifth aspects, wherein a metal shield cover covering the housing is mounted on the housing, at least one opening portion for exposing a portion of an outer surface of the shell is formed in the housing in a portion covered by the shield cover, and the shield cover and the shell contact with each other through the opening portion.

A method of manufacturing a waterproof connector of a seventh aspect comprises at least the following steps of:

(1) placing in an insert molding machine at least one contact made of a conductive material and a shell made of metal interior of which the contact is disposed and an insertion port into which a counterpart connector is inserted on one side, and forming a housing from an insulating resin material by insert molding integrally with the contact and the shell such that the shell is exposed at the outer circumference of and at the vicinity of the insertion port to form an outer circumferential exposure portion; and (2) disposing a waterproof portion on the outer circumferential exposure portion of the shell.

A method of manufacturing a waterproof connector of an eighth aspect is the manufacturing method of a waterproof connector of the seventh aspect, wherein at the step (2), the waterproof portion is formed as a waterproof member integrally formed on the outer circumferential exposure portion of the shell by insert molding of an elastic material.

A method of manufacturing a waterproof connector of a ninth aspect is the manufacturing method of a waterproof connector of the seventh aspect, wherein at the step (2), the waterproof portion is disposed by attaching a separately molded waterproof component to the outer circumferential exposure portion of the shell.

A method of manufacturing a waterproof connector of a tenth aspect is the manufacturing method of a waterproof connector of any one of the seventh to ninth aspects, wherein at the step (1), a closing portion is formed in the housing to close the shell on the side opposite to the insertion port, wherein the closing portion fixes the contact such that one side of the contact is disposed interior of the shell and the other side of the contact is projected outside the shell and a portion of the closing portion where the contact is fixed to is provided with a contact supporting portion extended therefrom for supporting the contact, the contact supporting portion is formed with a contact exposing portion for exposing a portion of the contact to which a counterpart contact of the counterpart connector comes into contact, and a plate-shaped reinforcing member is integrally disposed on the side opposite to the contact exposing portion across the contact supporting portion.

A method of manufacturing a waterproof connector of an eleventh aspect is the manufacturing method of a waterproof connector of any one of the seventh to tenth aspects, further comprising the step of (3) mounting a shield cover to cover the housing, wherein at the step (1), at least one opening portion exposing a portion of the shell is formed in the housing in a portion covered by the shield cover, and at the step (3), the shield cover and the shell contact with each other through the opening portion.

According to the waterproof connector of the first aspect, since the waterproof portion is directly disposed on the outer circumference of the shell, the thickness of the portion disposed with the waterproof portion can be made thinner as compared to a conventional connector having the waterproof portion formed on the housing, and the waterproof connector can be reduced in height and size.

According to the waterproof connector of the second aspect, since the waterproof portion is directly disposed on the outer circumferential exposure portion of the shell disposed to be exposed from the housing, the thickness of the portion disposed with the waterproof portion can be made thinner even when the housing is formed, and the waterproof connector can be reduced in height and size.

According to the waterproof connector of the third aspect, since the waterproof portion is the waterproof member formed by insert molding, the waterproof member can easily be formed.

According to the waterproof connector of the fourth aspect, the waterproof portion can easily be formed by attaching the waterproof component separately formed from an elastic material.

According to the waterproof connector of the fifth aspect, since the reinforcing member can be disposed to strengthen the contacts and the contact supporting portion supporting the contacts, when the contacts of the waterproof connector are connected to counterpart contacts of a counterpart connector, the contacts are restrained from bending or deforming even if the contacts are pressed by the counterpart contacts, and a higher contact pressure can be retained.

According to the waterproof connector of the sixth aspect, the shell and the shield cover are brought into contact to conduct electricity and static electricity in the shell can be released to the outside so as to suppress short-circuiting etc.

According to the manufacturing method of a waterproof connector of the seventh aspect, since the waterproof portion is directly disposed on the shell, the waterproof connector can be manufactured that can be reduced in height and size as compared to a conventional connector having the waterproof portion disposed on the housing.

According to the manufacturing method of a waterproof connector of the eighth aspect, since the water waterproof portion can be formed by integrally forming the waterproof member by insert molding on the outer circumferential exposure portion of the shell, the waterproof portion can easily be formed. Since the waterproof member is directly formed on the shell, the small-sized waterproof connector can be manufactured.

According to the manufacturing method of a waterproof connector of the ninth aspect, since the waterproof portion is formed by attaching the separately molded waterproof component on the shell, the small-sized waterproof connector can easily be manufactured.

According to the manufacturing method of a waterproof connector of the tenth aspect, since the reinforcing member can be disposed to strengthen the contacts and the contact supporting portion, the contacts are restrained from bending or deforming due to a pressing force when the contacts are connected to counterpart contacts, and the waterproof connector capable of retaining a higher contact pressure can be manufactured.

According to the waterproof connector of the eleventh aspect, by disposing the shield cover on the housing to contact the shell with the shield cover, static electricity in the shell can be released to the outside and the waterproof connector suppressing short-circuiting can be manufactured.

BRIEF DESCRIPTION OF THE DRAWINGS

FIG. 3A is a perspective view of an insert molded body; FIG. 3B is a cross-sectional view taken along a line IIIB-IIIB of FIG. 3A;

FIG. 7A is a perspective view of a shell; FIG. 7B is a plain view; FIG. 7C is a front view; FIG. 7D is side view from one direction; FIG. 7E is a bottom view;

FIG. 8A is a perspective view of a reinforcing member; FIG. 8B is a front view;

FIG. 8C is a plain view; FIG. 8D is a side view from one direction;

FIG. 9A is a perspective view of a shield cover; FIG. 9B is a plain view; FIG. 9C is a front view; FIG. 9D is a side view from one direction; FIG. 9E is a back view;

FIG. 11 is an exploded view of the waterproof connector of the second embodiment.

DESCRIPTION OF THE PREFERRED EMBODIMENTS

Preferred embodiments of the present invention will now be described with reference to the drawings. The following embodiments are mere exemplifications of a waterproof connector and a manufacturing method of the water proof connector for embodying a technical concept of the present invention and are not intended to limit the present invention thereto. The present invention is equally applicable to the other embodiments included in claims.

First Embodiment

A waterproof connector according to a first embodiment of the present invention will be described with reference to FIGS. 1A to 9E. A waterproof connector 10 according to the first embodiment has a configuration attached to a housing making up various devices such as portable telephones and information terminals including portable mobile devices and notebook personal computers and connected to a substrate disposed in the housing such that a counterpart connector such as USB (universal serial bus) is detachably inserted and connected. Since a known device can be utilized as the device to which the waterproof connector is attached, the device will not be depicted and described in detail.

Figure 1A:
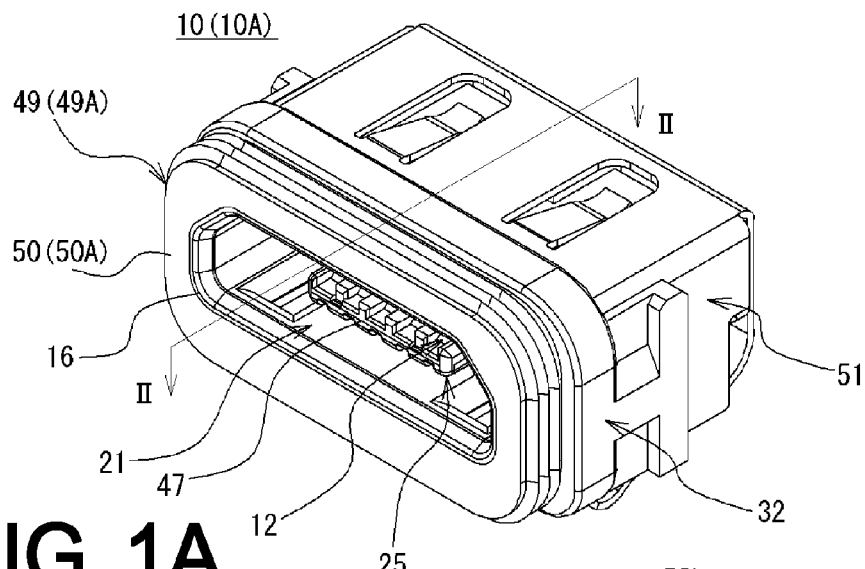
FIG. 1A is a perspective view of a waterproof connector of first and second embodiments.
Figure 1B:
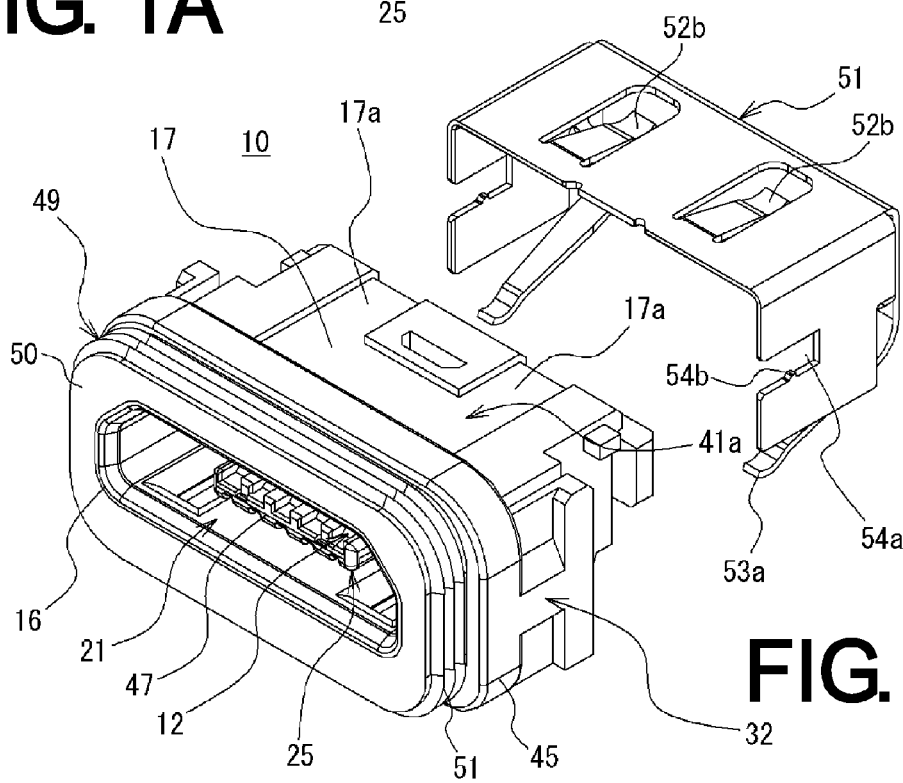
FIG. 1B is an exploded view of the waterproof connector of the first embodiment.
Figure 2:
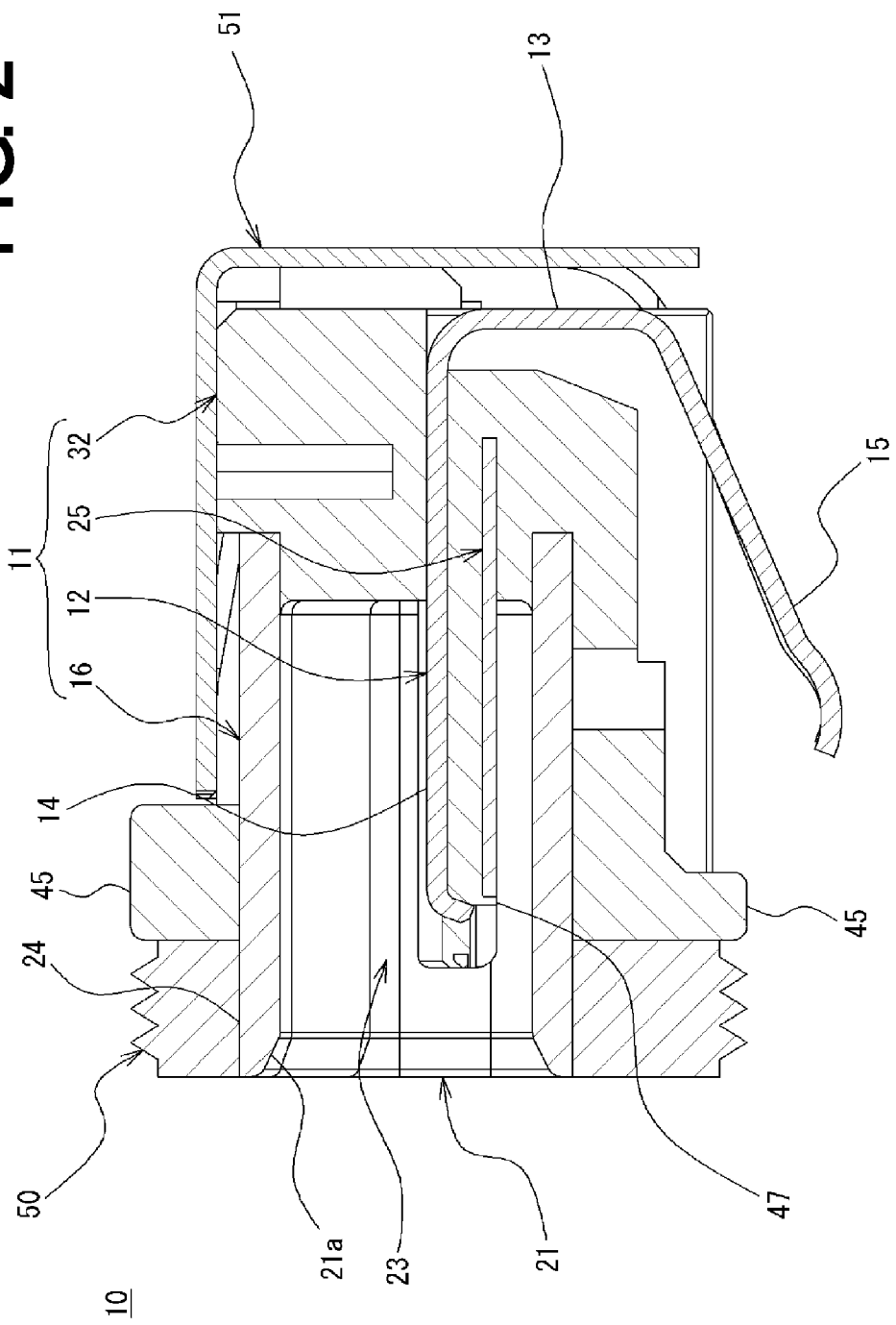
FIG. 2 is a cross-sectional view taken along a line II-II of FIG. 1A.

As depicted in FIGS. 1A, 1B, and 2, the waterproof connector 10 of the first embodiment is made up of a plurality of contacts 12, a metal shell 16 with the contacts 12 disposed therein, a reinforcing member 25 disposed under the contacts 12, and a housing 32 formed to integrate these elements. The housing 32 is made of an insulating resin material by insert molding such that the contacts 12 supported/fixed at predetermined intervals, the shell 16, and the reinforcing member 25 are integrated.

The housing 32 is provided with a contact supporting portion 47 extended to support the contacts 12 disposed in the shell 16 and the contact supporting portion 47 is interposed between the contact 12 located on the upper side and the reinforcing member 25 located on the lower side. As depicted in FIGS. 3A and 3B, a configuration of the contacts 12, the shell 16, and the reinforcing member 25 integrally formed with the housing 32 by insert molding is collectively referred to as an insert molded body 11.

The shell 16 has a waterproof portion 49 on the side connected to a counterpart connector. In the waterproof connector 10 of the first embodiment, the waterproof portion 49 is disposed with a waterproof member 50 formed integrally with the shell 16 by insert molding of an elastic material. A metal shield cover 51 is mounted on the housing 32, covering a portion of the housing 32.

Although the contacts 12 making up the waterproof connector 10 of the first embodiment are so-called compression type contacts pressed into contact with a substrate etc., in this description, surface-mount type contacts are also available.

Constituent elements of the waterproof connector 10 of the first embodiment will be described with reference to FIGS. 3 to 9. The contacts 12, the shell 16, the reinforcing member 25, and the housing 32 making up the insert molded body 11 will be described along with the insert molded body 11.

As depicted in FIGS. 4A, 4B, 5B, and 6A, the contacts 12 of the first embodiment are made up of a plurality of, for example, five, contacts 12 and are arranged symmetrically relative to the center contact 12. Although respective shapes are different, the five contacts 12 of the first embodiment have a common configuration and, therefore, as depicted in FIG. 6B, one of the contacts 12 will representatively be described.

Figure 6A:
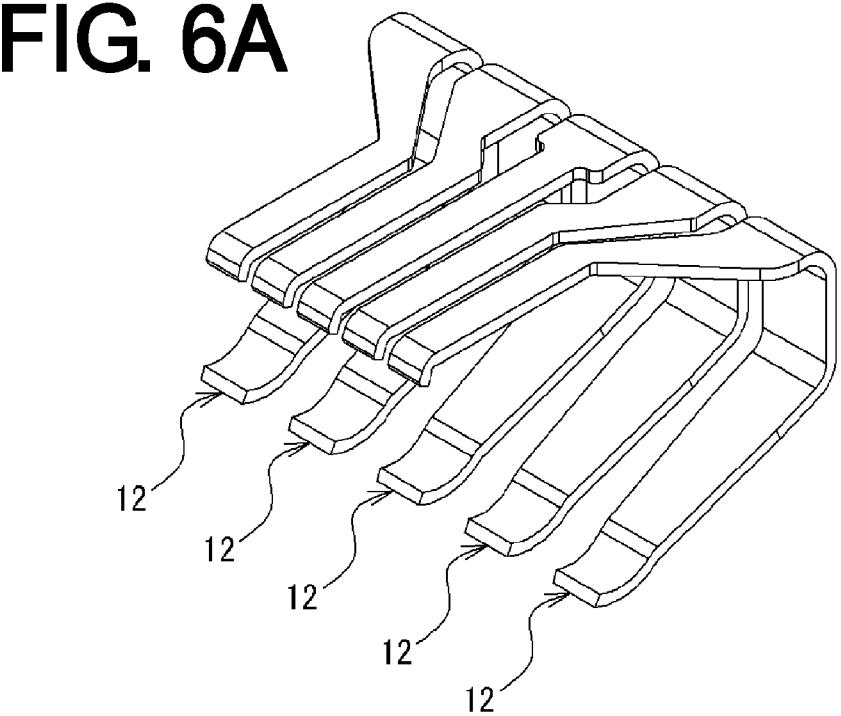
FIG. 6A is a perspective view of a plurality of contacts.
Figure 6B:
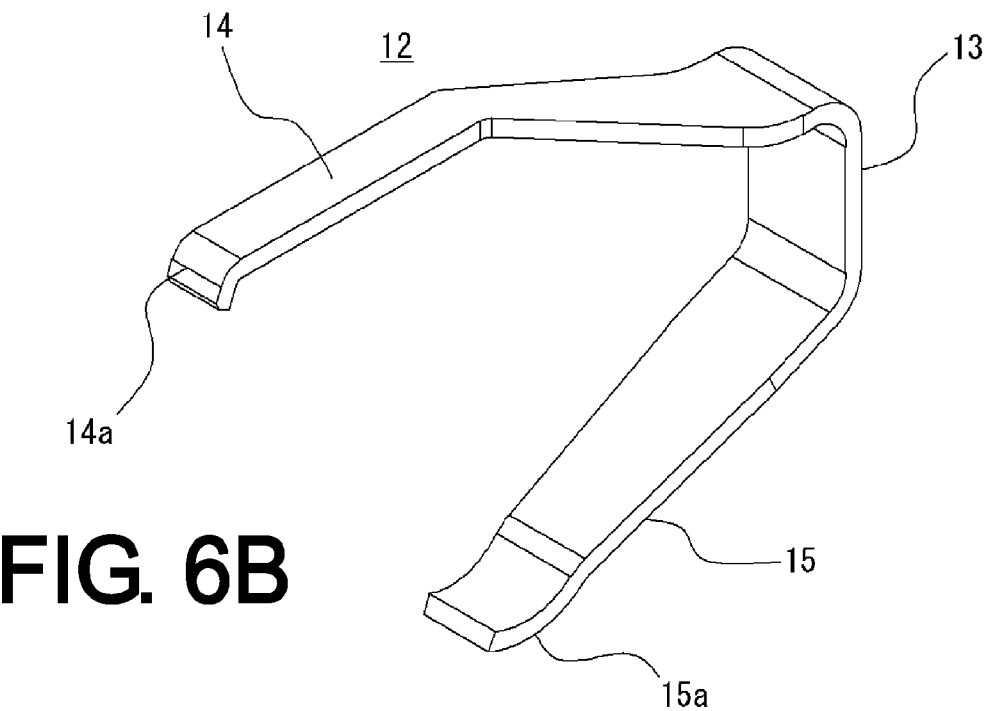
FIG. 6B is a perspective view of one contact.

The contact 12 has a contact main body 13 made of a conductive metal plate as depicted in FIG. 6B and is disposed with a connecting portion 14 connected to a counterpart contact included in a counterpart connector on one side and a contacting portion 15 brought into contact with a substrate etc., included in the device on the other side. The contact main body 13 is bent in the same direction at two positions near the center portion. The contact main body 13 is bent into a form corresponding to a position at which the contact 12 is located in the housing 32, i.e., is bent at two positions in opposite directions.

A tip part 14a of the connecting portion 14 of the contact 12 is formed into a curved surface for smooth connection with the counterpart contact of the counterpart connector. A tip part 15a of the contacting portion 15 of the contact 12 is also formed into a curved shape for smooth contact with the substrate etc.

The contact 12 in the insert molded body 11 is fixed to the housing 32 as depicted in FIGS. 3A to 5B, and a portion of the contact main body 13 is integrally fixed to the housing 32 by insert molding while a surface of the connecting portion 14 other than the surface brought into contact with the counterpart contact is fixed to and integrated with the contact supporting portion 47 of the housing 32.

Although the contacts 12 of the first embodiment are made up of five contacts, this is not a limitation and the number of contacts may be less than five or more than five. The shape of the contact 12 is not limited to those depicted in FIGS. 6A and 6B and may be an arbitrary shape.

The shell 16 will be described. As depicted in FIGS. 3B, 4A, and 7A to 7E, the shell 16 is made up of an upper surface 17, a bottom surface 18, a first side surface 19, and a second side surface 20 made of metal plates having a predetermined thickness. The shell 16 is formed into a tubular flattened rectangular parallelepiped having an insertion port 21 into which the counterpart connector is inserted on one side and a projection port 22 from which the arranged contacts 12 are projected on the other side and having a space 23 in which a plurality of the contacts 12 is disposed.

The upper surface 17 of the shall 16 is formed into a rectangular shape with a predetermined area and is provided with respective first extending portions 17a in a narrow plate shape extended from both ends of the upper surface 17 on the projection port 22 side. The first extending portions 17a are portions brought into contact with the shield cover 51 described later to conduct electricity (see FIGS. 1A and 1B).

First projecting portions 17b in a narrow plate shape projected toward the first and second side surfaces 19 and 20 of the shell 16 are respectively formed from the first extending portions 17a. The first projecting portions 17b are used when the shell 16 is placed in an insert molding machine described later, and are partially integrally formed with the housing 32 to further strengthen the integration between the shell 16 and the housing 32.

The bottom surface 18 of the shell 16 is formed into a rectangular shape with a predetermined area and has concave portions 18a formed at two positions by concaving portions of the bottom surface 18. The concave portions 18a are formed to be engaged with convex portions formed on the counterpart connector at the time of connection with the counterpart connector so as to certainly establish the connection between the waterproof connector 10 of the first embodiment and the counterpart connector, and can act as a retainer so that the connectors hardly come off. The formation of the concave portions 18a in the bottom surface 18 increases an area brought into contact with the housing 32, thereby further strengthening the integration with the housing 32.

In the shell 16 depicted in FIG. 7A, portions linked to the upper surface 17 and the first and second side surfaces 19 and 20 are formed in a slanted manner. The shape of the shell 16 is formed in accordance with a shape of the counterpart connector to be connected. A taper 21a is formed in the insertion port 21 of the shell 16 toward the inside space 23 such that the counterpart connector can smoothly be inserted.

As depicted in FIGS. 3A to 5B, the housing 32 is not formed on an outer circumference of the shell 16 on the insertion port 21 side in the insert molded body 11 and the shell 16 is exposed. This exposure portion of the shell 16 forms an outer circumferential exposure portion 24 disposed with the waterproof member 50.

As depicted in FIGS. 3B, 4A, and 8A to 8D, the reinforcing member 25 is a plate-shaped body with a predetermined thickness and has a support surface 26 formed with an area capable of supporting a plurality of the contacts 12 arranged in the space 23 in the shell 16. The support surface 26 has a front portion 27 disposed on the insertion port 21 side of the shell 16, a rear portion 28 opposing the front portion 27, a first side portion 29, and a second side portion 30. The front portion 27 and the first and second side portions 29 and 30 of the supporting surface 26 are respectively provided with a front standing portion 27a, a first side standing portion 29a, and a second side standing portion 30a standing at a predetermined height.

Figure 10A:
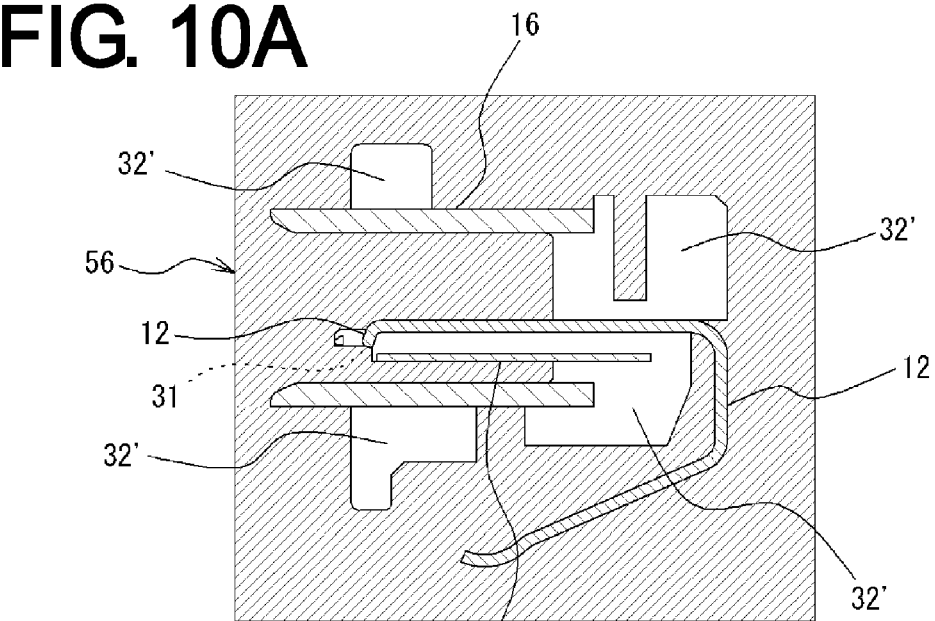
FIG. 10A is a cross-sectional view of a process of manufacturing a housing.

A plurality of holes 31 is formed on the front portion 27 side of the support surface 26 from the front standing portion 27a into the support surface 26. The holes 31 are for the purpose of being combined with a metal mold 56 disposed in the insert molding machine so that the contacts 12 arranged within the shell 16 are supported by the metal mold (see FIG. 10A). The holes 31 are also for the purpose of causing a resin material to enter through a gap between the metal mold and the holes 31 of the reinforcing member 25 when the housing 32 is formed, so as to form the contact supporting portion 47 and cause the integration between the housing 32 and the reinforcing member 25.

A second extending portion 28a extended in the direction of the rear portion 28 is formed in the rear portion 28 of the support surface 26, and second projecting portions 28b in a narrow plate shape are respectively formed and projected from the second extending portion 28a toward the first and second side portions 29 and 30. The second projecting portions 28b are used when the reinforcing member 25 is placed in the insert molding machine described later, and are partially integrally formed with the housing 32 to further strengthen the integration between the reinforcing member 25 and the housing 32.

The housing 32 will be described. As depicted in FIG. 3A to 5B, the housing 32 is formed to cover the outside of the shell 16 with the contact 12 and the reinforcing member 25 integrated therein. The housing 32 has a front surface portion 33 disposed on the insertion port 21 side of the shell 16, a back surface portion 34 opposing the front surface portion 33, a first side surface portion 35, and a second side surface portion 36 and is formed into a rectangular parallelepiped shape having an upper surface portion 41 and a bottom surface portion 42. The upper surface portion 41, the first side surface portion 35, the bottom surface portion 42, and the second side surface portion 36 have respective portions projected on the front surface portion 33 side of the housing 32 and these projecting portions form an annular flange portion 45.

Figure 4A:
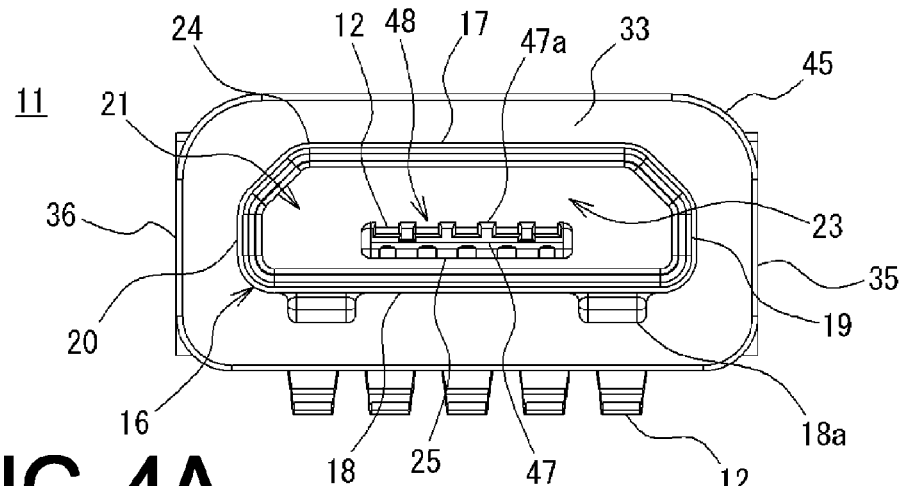
FIG. 4A is a front view of the insert molded body.

As depicted in FIGS. 3A and 4A, the front surface portion 33 of the housing 32 allows the shell 16 to project and has a surface formed larger than the insertion port 21 of the projecting shell 16. The recess portions 18a formed in the shell 16 are formed to partially overlap with the front surface portion 33. The outer circumference of the shell 16 projecting from the front surface portion 33 of the housing 32 forms the outer circumferential exposure portion 24 disposed with the waterproof member 50 acting as the waterproof portion 49. The outer circumferential exposure portion 24 is a range from the insertion port 21 to the front surface portion 33 formed in the housing 33.

Figure 4B:
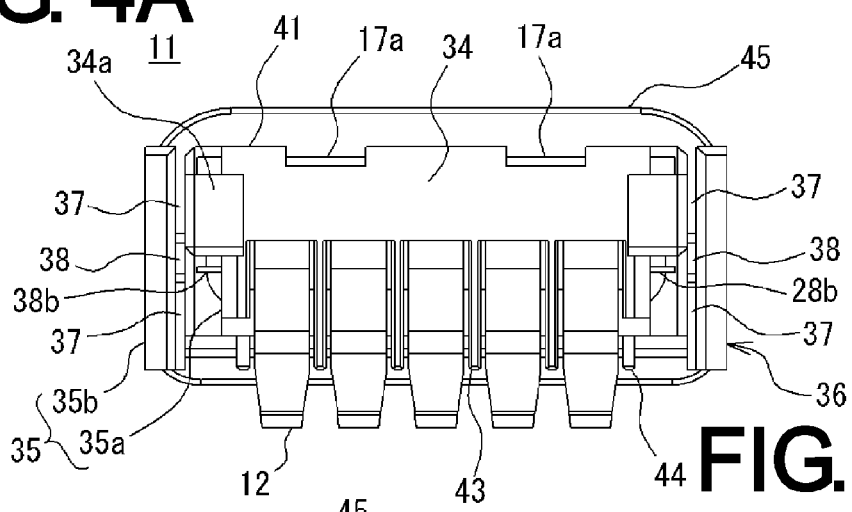
FIG. 4B is a back view.

As depicted in FIGS. 3B and 4B, the back surface portion 34 of the housing 32 allows the contacts 12 to project and has an insertion portion 46a into which the contacts 12 are inserted. The back surface portion 34 has respective partition wall portions 43 between the contacts 12 so as to restrain the contacts 12 passing thorough the insert portion 46a from contacting with each other. The back surface portion 34 is provided with a locking projection 34a locking a portion of the shield cover 51 described later.

Figure 5A:
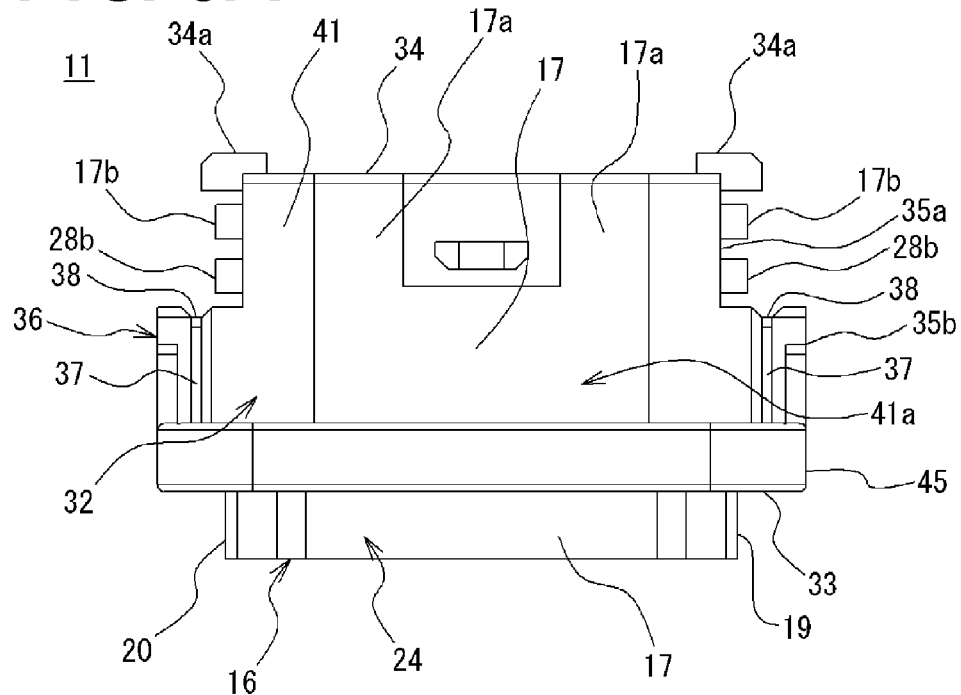
FIG. 5A is a plain view of the insert molded body.

As depicted in FIGS. 3A and 5A, the upper surface portion 41 of the housing 32 is provided with an opening portion 41a exposing portions of the upper surface 17 and the first extending portions 17a of the shell 16. The shell 16 exposed from the opening portion 41a comes into contact with a portion of the shield cover 51 described later. Therefore, the shape of the opening portion 41a is not limited thereto, may be disposed with a plurality of opening portions, and may have an arbitrary shape.

Figure 5B:
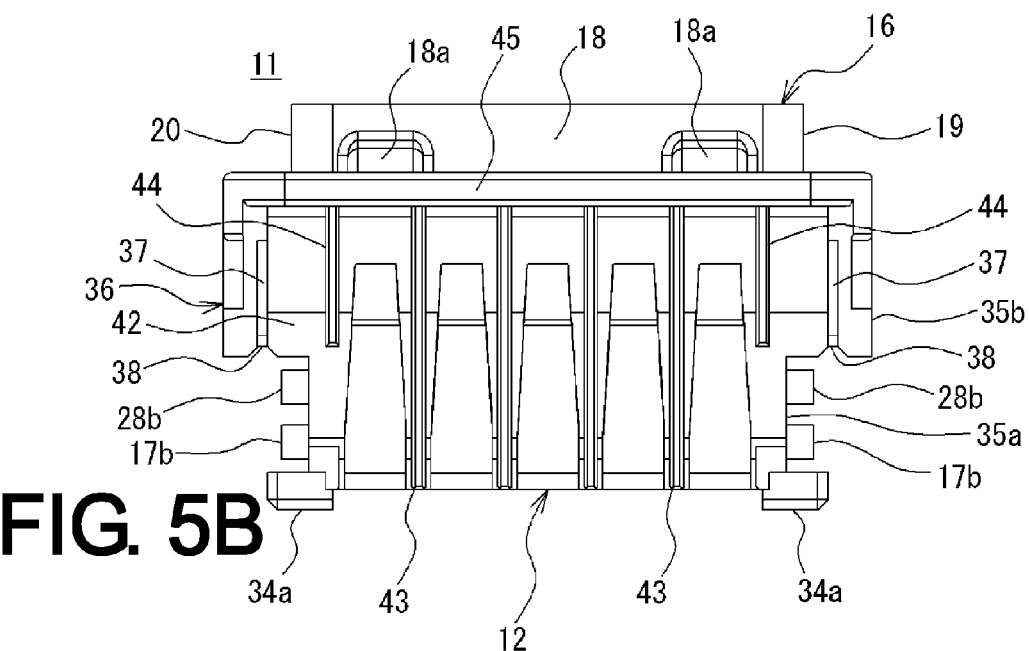
FIG. 5B is a bottom view.

As depicted in FIG. 5B, the bottom surface portion 42 of the housing 32 is formed with a predetermined area and the partition wall portions 43 of the back surface portion 34 are formed across the bottom surface portion 42. The bottom surface portion 42 has end partition wall portions 44 formed shorter than the partition wall portions 43 in the axial direction of the housing 32 on the outside of the contacts 12 disposed on the outermost sides along with the partition wall portions 43 from the back surface portion 34. The partition wall portions 43 and the end partition wall portions 44 are formed higher than the bottom surface portion 42 in the height direction of the housing 32. The height is set to form gaps such that when the waterproof connector 10 is pressed and brought into contact with the substrate in the device, the contacting portions 15 of the contacts 12 pressed by a pressing force can be fit into the gaps. The end portions of the partition wall portions 43 and the end partition wall portions 44 on the bottom surface 42 side act as portions placed on the substrate etc., so that the waterproof connector can stably be mounted on the substrate.

The first side surface portion 35 and the second side surface portion 36 of the housing 32 have a common configuration except that the portions are symmetrical and, therefore, the first side surface portion 35 will representatively be described.

Figure 4C:
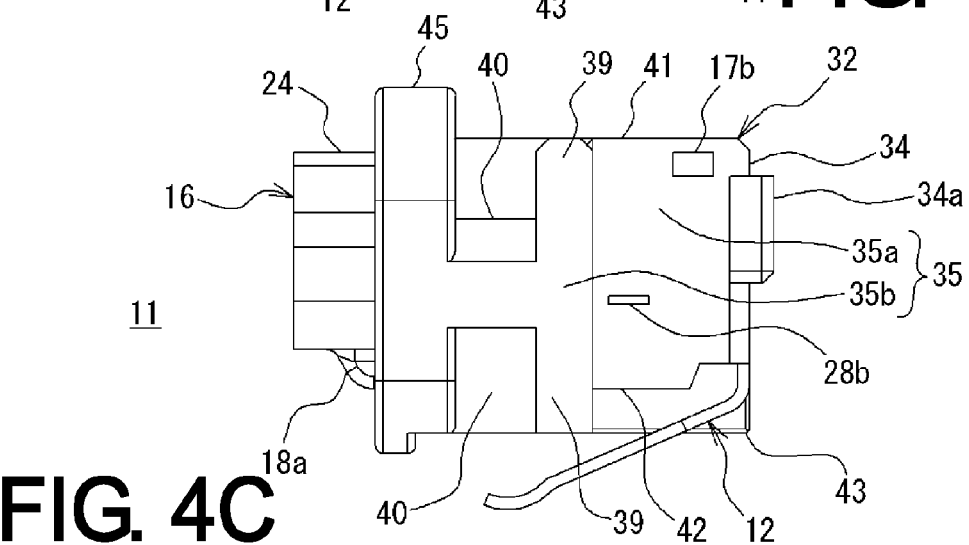
FIG. 4C is a side view from one direction.

As depicted in FIGS. 3A, 4C, and 5A, the first side surface portion 35 of the housing 32 are formed in two stages of a lower stage portion 35a and a higher stage portion 35b. The first projecting portions 17b of the shell 16 and the second projecting portions 28b of the reinforcing member 25 placed in the insert molding machine are projected from the lower stage portion 35a when integrated in the housing 32. On the other hand, the higher stage portion 35b has grooves 37 formed on the upper surface portion 41 side and the bottom surface portion 42 side, and the grooves 37 are linked at a center portion. This linked portion at the center portion acts as an engagement portion 38 engaged with the shield cover 51 described later.

A protruding portion 39 and groove portions 40 are formed on the side surface side of the higher stage portion 35b. The protruding portion 39 and the groove portions 40 are used along with the flange portion 45 when attached to a housing making up the device. Therefore, the protruding portion 39, the groove portions 40, and the flange portion 45 are formed in accordance with an attaching portion etc., formed on the housing of the device.

As depicted in FIG. 3B, a closing portion 46 closing the projection port 22 of the shell 16 is formed on the side of the housing 32 opposite to the insertion port 21 in the shell 16. The contact supporting portion 47 is formed from the closing portion 46 into the shell 16. The contact supporting portion 47 is formed on the reinforcing member 25 and the contacts 12 are disposed on the upper side across the contact supporting portion 47. Separating portions 47a separating each of the contacts 12 are formed on the contact 12 side of the contact supporting portion 47 (see FIGS. 3A and 4A).

The contact supporting portion 47 is provided with contact exposing portions 48 exposing the contacts 12 such that the upper sides of the contacts 12 can be connected to the counterpart contacts of the counterpart connector. A tip portion 47b of the contact supporting portion 47 is formed to cover the tip sides of the connecting portions 14 of the contacts 12. The tip sides of the tip portion 47b and the separating portions 47a of the contact supporting portion 47 have a taper formed to facilitate insertion of the counterpart contacts. The tip side of the contact supporting portion 47 and the tip sides of the separating portions 47a are formed on the front standing portion 27a of the reinforcing member 25 disposed on the underside. The separating portions 47a are also formed on the first side standing portion 29a and the second side standing portion 30a of the reinforcing member 25.

When the contact supporting portion 47 and the reinforcing member 25 are integrated, the reinforcing member 25 reinforces the strength of the contact supporting portion 47 to restrain the contacts from bending or deforming even when the contacts are pressed at the time of connection with the counterpart connectors so that the contact pressure of the contacts can be retained.

The waterproof member 50 of the first embodiment will be described with reference to FIG. 1. The waterproof member 50 of the first embodiment is formed integrally with the outer circumferential exposure portion 24 disposed on the shell 16 by insert molding of an elastic material. Therefore, the waterproof member 50 of the first embodiment is formed by first forming an insert molded body and then placing this insert molded body in an insert molding machine to insert-mold the waterproof member 50.

The waterproof member 50 is formed into an annular shape surrounding the outer circumferential exposure portion 24 of the shell 16 and is formed into substantially the same size as that of the front surface portion 33 of the housing 32. When attached to the housing of the device, the waterproof member 50 fits between the housing and the waterproof connector 10 and deforms to fill a gap so that the infiltration of water etc. can be prevented.

Therefore, the elastic material of the waterproof member 50 is preferably an elastically deformable material capable of closely adhering to the metal shell and particularly preferably silicone rubber. Although convexes and concaves are formed on an outer circumferential portion 50a of the waterproof member 50 depicted in FIG. 1B to increase adhesiveness, this is not a limitation and the outer circumferential portion 50a may not be provided with convexes and concaves given that adhesiveness is acquired, or may be formed into another shape.

The shield cover 51 will be described with reference to FIGS. 1A, 1B and 9A to 9E. The shield cover 51 is formed by bending a metal plate. The shield cover 51 is formed into a size partially covering the housing 32 and is made up of an upper surface plate portion 52 covering the upper surface portion 41 of the housing 32, a back surface plate portion 53 covering the back surface portion 34 of the housing 32, and a first side surface plate portion 54 and a second side surface plate portion 55 covering the first side surface portion 35 and the second side surface portion 36, respectively, of the housing 32. The shield cover 51 is opened in portions corresponding to the front surface portion 33 and the bottom surface portion 42 of the housing 32 and is inserted and mounted on the housing 32 through these portions.

As depicted in FIGS. 9A and 9B, the upper surface plate portion 52 of the shield cover 51 is formed into a size such that the upper surface portion 41 except the flange portion 45 of the housing 32 is covered. The upper surface plate portion 52 is provided with two open holes 52a and the open holes 52a are provided with conductive pieces 52b formed integrally with the upper surface plate portion 52. The conductive pieces 52b are brought into contact with the first extending portions 17a on the upper surface of the shell 16 through the opening portion 41a of the housing 32 of the insert molded body.

As depicted in FIGS. 9A, 9D, and 9E, the back surface plate portion 53 of the shield cover 51 has a center portion formed into a size covering the back surface portion 34 of the housing 32 and into substantially the same height as that of the partition wall portions 43 of the back surface portion 34 of the housing 32. This height is formed such that when the waterproof connector 10 is pressed by the substrate and the partition wall portions 43 are placed, a slight gap is made between the substrate and the back surface plate portion 53.

A pair of cover terminals 53a brought into contact with the substrate is formed in the both end portions of the back surface plate portion 53. The cover terminals 53a are brought into contact with the substrate to be conductive so that static electricity charged in the shield cover 51 can be released. The shield cover 51 is brought into contact with the shell 16 through the conductive pieces 52b so that static electricity charged in the shell 16 can also be released. The same effect can be acquired for the reinforcing member 25 by bringing the reinforcing member 25 and the shield cover 51 into contact with each other. Portions of the cover terminals 53a coming into contact with the substrate are formed into curved surfaces to enable smooth contact.

The first side surface plate portion 54 and the second side surface plate portion 55 of the shield cover 51 will be described. The first side surface plate portion 54 and the second side surface plate portion 55 are the same except that the shapes are symmetrical and, therefore, the first side surface plate portion 54 will representatively be described.

As depicted in FIGS. 9A and 9D, the first side surface plate portion 54 is formed into a size covering the first side surface portion 35 except the flange portion 45 of the housing 32. The first side surface plate portion 54 is provided with an engagement groove 54a engaged with the engagement portion 38 formed in the higher stage portion 35b of the first side surface portion 35 of the housing 32.

A convex portion 54b is formed in the engagement groove 54a and the convex portion 54b can fit into the engagement portion 38 to retain the shield cover 51. The first side surface plate portion 54 is provided with a locking piece 54c locked by the locking projection 34a formed on the back surface portion 34 of the housing 32 such that the locking piece 54c is bent toward the inside of the shield cover 51 (see FIG. 9C) and the shield cover 51 can be restrained from rocking and can be positioned and fixed by locking the locking projection 34a and the locking piece 54c.

Such a configuration enables the waterproof connector of the first embodiment to have a portion forming the waterproof member formed thinner and, therefore, the waterproof connector can be downsized.

A manufacturing method of the waterproof connector 10 of the first embodiment will be described. First, the insert molded body 11 making up the waterproof connector 10 of the first embodiment is formed. When the insert molded body 11 is formed, a plurality of the contacts 12, the shell 16, and the reinforcing member 25 separately formed in advance are placed in an insert molding machine (see FIG. 10A). The metal mold 56 for forming the housing 32 is then placed and a resin material is injected into a hollow portion 32' of the insert molding machine to form the housing 32, thereby forming the insert molded body 11 with the contacts 12, the shell 16, and the reinforcing member 25 integrated. The contacts 12, the shell 16, and the reinforcing member 25 are formed by punching work, bending work, pressing work, etc., of metal plates.

Figure 10B:
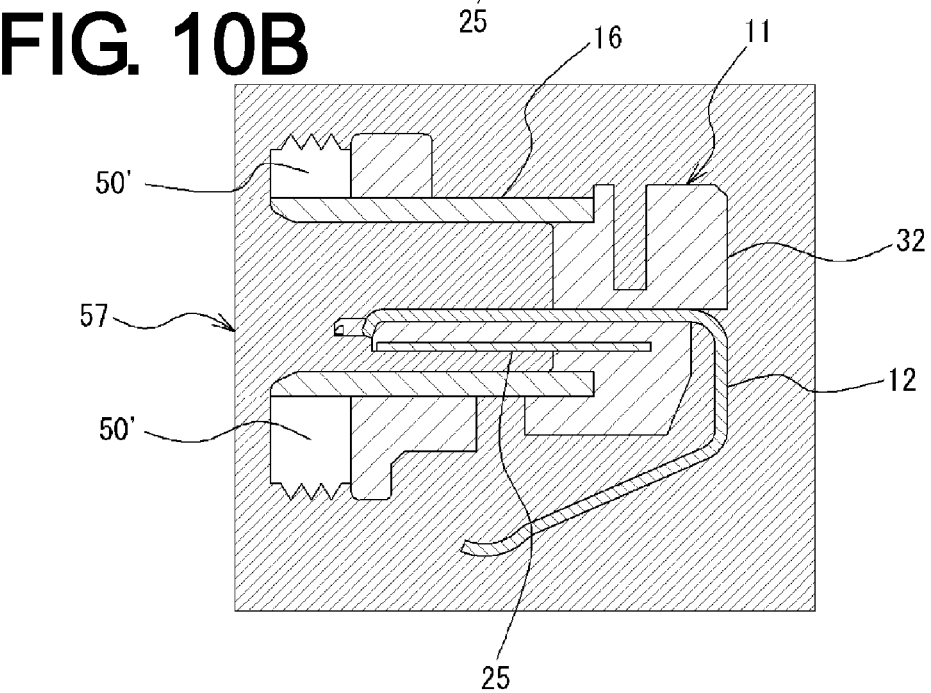
FIG. 10B is a cross-sectional view of a process of manufacturing a waterproof member.

The waterproof portion 49 is then formed. The waterproof portion 49 is formed integrally with the outer circumferential exposure portion 24 of the shell 16 of the insert molded body 11 by insert molding of the waterproof member 50. In this manufacturing method, first, the preliminarily formed insert molded body 11 is disposed in an insert molding machine in which a metal mold 57 for molding the waterproof member 50 is placed (see FIG. 10B). An elastic material is then injected into a hollow portion 50' of the insert molding machine to form the waterproof member 50 integrally with the outer circumferential exposure portion 24 of the shell 16 of the insert molded body 11. The elastic material forming the waterproof member is preferably a material easily adhering to the metal shell and particularly preferably silicon rubber.

The preliminarily formed shield cover 51 is attached to the housing 32 of the insert molded body 11 with the waterproof member 50 formed. When the shield cover 51 is attached, the shield cover 51 is fitted from the back surface portion 34 side of the housing 32 of the insert molded body 11 to engage the engagement portions 38 formed in the first and second side surface portions 35 and 36 of the housing 32 with the engagement groove 54a formed in the shield cover 51. The locking projection 34a on the back surface portion 34 of the housing 32 is locked with the locking piece 54c of the shield cover 51. This brings the conductive pieces 52b of the shield cover 51 into contact with the first extending portions 17a of the shell 16. As a result, the waterproof connector 10 of the first embodiment is completed (see FIG. 1A).

According to the manufacturing method of the waterproof connector of the first embodiment, the waterproof member is formed by insert molding as described above and, therefore, the small-sized waterproof connector can easily be manufactured.

Second Embodiment

The waterproof connector 10 of the first embodiment has been described as the configuration having the waterproof member 50 formed by insert molding as the waterproof portion 49. A waterproof connector 10A of a second embodiment will be described as a configuration having a separately formed waterproof component 50A attached as a waterproof portion 49A. Since the waterproof connector 10A of the second embodiment is only different in configuration of the waterproof portion 49A from the waterproof connector 10 of the first embodiment, the other common constituent elements are denoted by the same reference numerals and will not be described.

As depicted in FIG. 11, the waterproof connector 10A of the second embodiment is made up of the insert molded body 11 made up of a plurality of the contacts 12, the shell 16, the reinforcing member 25, and the housing 32, the waterproof component 50A attached to the insert molded body 11, and the shield cover 51. The configuration of the insert molded body 11 and the shield cover 51 is common with that of the first embodiment and therefore will not be described.

As depicted in FIGS. 1A and 11, the waterproof component 50A of the second embodiment is an annular body made of an elastic material having an attachment port 50Aa to which the outer circumferential exposure portion 24 of the shell 16 is inserted and attached in the center. The width of the waterproof component 50A is formed as a width covering the outer circumferential exposure portion 24 when attached to the outer circumferential exposure portion 24 of the shell 16. The thickness of the waterproof component 50A is formed as substantially the same thickness as that of the front surface portion 33 of the housing 32 of the insert molded body 11. The attachment port 50Aa is formed into substantially the same shape as the outer shape of the outer circumferential exposure portion 24 so that the waterproof component 50A can be attached to the outer circumferential exposure portion 24 of the shell 16.

As depicted in FIG. 11, the attachment port 50Aa has concaves 50Ab formed to be fit to the concave portions 18a formed in the bottom surface 18 of the shell 16. The inner circumference of the attachment port 50Aa is formed slightly smaller than the outer circumferential exposure portion 24 and can be attached in a closely adhering manner by fitting to the outer circumferential exposure portion 24. This attachment can be implemented not only by fitting but also by using an adhesive as needed.

With such a configuration, according to the waterproof connector of the second embodiment, the small-sized waterproof connector can easily be manufactured by attaching the waterproof component separately formed from an elastic material.

A manufacturing method of the waterproof connector 10A of the second embodiment will be described. First, the insert molded body 11 making up the waterproof connector 10A of the second embodiment is formed. The formation of the insert molded body 11 is the same as the first embodiment and therefore will not be described in detail.

The separately formed waterproof component 50A is attached to the outer circumferential exposure portion 24 of the shell 16 of the insert molded body 11. This attachment is achieved by fitting the attachment port 50Aa of the waterproof component 50A to the outer circumferential exposure portion 24. Since the attachment port 50Aa of the waterproof component 50A is formed slightly smaller than the outer circumferential exposure portion 24, the waterproof component 50A can be attached in a closely adhering manner to the outer circumferential exposure portion 24.

The shield cover 51 is then attached to the housing 32 of the insert molded body 11. The attachment of the shield cover 51 is the same as the first embodiment and therefore will not be described in detail. As a result, the manufacturing of waterproof connector of the second embodiment is completed.

According to the manufacturing method of the water proof connector of the second embodiment, the small-sized waterproof connector can easily be manufactured by attaching the waterproof component separately formed from an elastic material.

What is claimed is:

1. A waterproof connector, comprising:
    at least one contact made of a conductive material; and
    a shell made of metal interior of which the contact is disposed,
        wherein the shell has an insertion port into which a counterpart connector is inserted on one side, and a waterproof portion made of an elastic material is disposed, in its entirety, on an outer circumference of and at the vicinity of the insertion port of the shell, the vicinity of the insertion port of the shell being within the waterproof portion, and
        wherein the elastic material is insert molded with the shell so that the waterproof portion is integrally formed with the shell.

2. The waterproof connector of claim 1, wherein
    the contact and shell are fixed by a housing made of an insulating resin material so as to form an integral structure,
    the housing is formed such that the shell is exposed at the outer circumference of and at the vicinity of the insertion port to form an outer circumferential exposure portion, and
    the outer circumferential exposure portion of the shell is disposed with the waterproof portion.

3. The waterproof connector of claim 2, wherein the shell is closed on the side opposite to the insertion port by a closing portion formed in the housing,
    the closing portion fixes the contact such that one side of the contact is disposed interior of the shell and the other side of the contact is projected outside the shell,
    a portion of the closing portion where the contact is fixed to is provided with a contact supporting portion extended therefrom for supporting the contact,
    the contact supporting portion is formed with a contact exposing portion for exposing a portion of the contact to which a counterpart contact of the counterpart connector comes into contact, and
    a plate-shaped reinforcing member is integrally disposed on the side opposite to the contact exposing portion across the contact supporting portion.

4. The waterproof connector of claim 2, wherein
    a metal shield cover covering the housing is mounted on the housing,
    at least one opening portion for exposing a portion of an outer surface of the shell is formed in the housing in a portion covered by the shield cover, and
    the shield cover and the shell contact with each other through the opening portion.

5. A method of manufacturing a waterproof connector, the method comprising at least the following steps of:
    (1) placing in an insert molding machine at least one contact made of a conductive material and a shell made of metal interior of which the contact is disposed and an insertion port into which a counterpart connector is inserted on one side, and forming a housing from an insulating resin material by insert molding integrally with the contact and the shell such that the shell is exposed at the outer circumference of and at the vicinity of the insertion port to form an outer circumferential exposure portion; and
    (2) disposing, in its entirety, a waterproof portion on the outer circumferential exposure portion of the shell by insert molding the elastic material with the shell so that the water proof portion is integrally formed with the shell, the vicinity of the insertion port of the shell being within the waterproof portion.

6. The method of manufacturing a waterproof connector of claim 5, wherein
    at the step (1), a closing portion is formed in the housing to close the shell on the side opposite to the insertion port, wherein
    the closing portion fixes the contact such that one side of the contact is disposed interior of the shell and the other side of the contact is projected outside the shell and a portion of the closing portion where the contact is fixed to is provided with a contact supporting portion extended therefrom for supporting the contact,
    the contact supporting portion is formed with a contact exposing portion exposing a portion of the contact to which a counterpart contact of the counterpart connector comes into contact, and
    a plate-shaped reinforcing member is integrally disposed on the side opposite to the contact exposing portion across the contact supporting portion.

7. The method of manufacturing a waterproof connector of claim 5, further comprising a step of
    (3) mounting a shield cover to cover the housing,
    wherein at the step (1), at least one opening portion exposing a portion of the shell is formed in the housing in a portion covered by the shield cover, and at the step (3), the shield cover and the shell contact with each other through the opening portion.

8. A waterproof connector, comprising:
    at least one contact made of a conductive material; and
    a shell made of metal interior of which the contact is disposed,
        wherein the shell has an insertion port into which a counterpart connector is inserted on one side, and a waterproof portion is disposed, in its entirety, on an outer circumference of and at the vicinity of the insertion port of the shell, the vicinity of the insertion port of the shell being within the waterproof portion, and
        wherein the waterproof portion is made of silicone rubber directly attached to the shell.

9. A waterproof connector, comprising:
    at least one contact made of a conductive material; and
    a shell made of metal interior of which the contact is disposed,
        wherein the shell has an insertion port into which a counterpart connector is inserted on one side, and a waterproof portion made of an elastic material is disposed, in its entirety, on an outer circumference of and at the vicinity of the insertion port of the shell, the vicinity of the insertion port of the shell being within the waterproof portion, and wherein the elastic material made of silicone rubber is insert molded with the shell so that the waterproof portion is integrally formed with the shell.

10. A method of manufacturing a waterproof connector, the method comprising at least the following steps of:
   (1) placing in an insert molding machine at least one contact made of a conductive material and a shell made of metal interior of which the contact is disposed and an insertion port into which a counterpart connector is inserted on one side, and forming a housing from an insulating resin material by insert molding integrally with the contact and the shell such that the shell is exposed at the outer circumference of and at the vicinity of the insertion port to form an outer circumferential exposure portion; and
   (2) disposing, in its entirety, a waterproof portion made of silicone rubber so as to be directly attached on the outer circumferential exposure portion of the shell, the vicinity of the insertion port of the shell being within the waterproof portion.

11. A method of manufacturing a waterproof connector, the method comprising at least the following steps of:
   (1) placing in an insert molding machine at least one contact made of a conductive material and a shell made of metal interior of which the contact is disposed and an insertion port into which a counterpart connector is inserted on one side, and forming a housing from an insulating resin material by insert molding integrally with the contact and the shell such that the shell is exposed at the outer circumference of and at the vicinity of the insertion port to form an outer circumferential exposure portion; and
   (2) disposing, in its entirety, a waterproof portion on the outer circumferential exposure portion of the shell by insert molding the elastic material made of silicone rubber with the shell so that the water waterproof is integrally formed with the shell, the vicinity of the insertion port of the shell being within the waterproof portion.

* * * * *